(12) United States Patent
Wang et al.

(10) Patent No.: US 11,750,292 B2
(45) Date of Patent: Sep. 5, 2023

(54) METHOD FOR DETERMINING OPTICAL SIGNAL POWER CHANGE AND POWER CALCULATION APPARATUS

(71) Applicant: Huawei Technologies Co., Ltd., Shenzhen (CN)

(72) Inventors: Yuanwu Wang, Wuhan (CN); Wei Liu, Wuhan (CN); Fei Chen, Wuhan (CN); Yufeng Su, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/731,909

(22) Filed: Apr. 28, 2022

(65) Prior Publication Data

US 2022/0255625 A1 Aug. 11, 2022

Related U.S. Application Data

(63) Continuation of application No. PCT/CN2019/114838, filed on Oct. 31, 2019.

(51) Int. Cl.
| | |
|---|---|
| *H04B 10/293* | (2013.01) |
| *H04B 10/564* | (2013.01) |
| *H04J 14/02* | (2006.01) |
| *H04B 10/2537* | (2013.01) |
| *H04B 10/67* | (2013.01) |

(52) U.S. Cl.
CPC ..... *H04B 10/2933* (2013.01); *H04B 10/2537* (2013.01); *H04B 10/293* (2013.01); *H04B 10/564* (2013.01); *H04B 10/672* (2013.01); *H04J 14/0221* (2013.01)

(58) Field of Classification Search
None
See application file for complete search history.

(56) References Cited

U.S. PATENT DOCUMENTS

| | | | |
|---|---|---|---|
| 5,663,823 A | 9/1997 | Suzuki | |
| 6,724,526 B1 * | 4/2004 | Onaka | H04J 14/0221 |
| | | | 359/337.12 |

(Continued)

FOREIGN PATENT DOCUMENTS

| | | |
|---|---|---|
| CN | 1419355 A | 5/2003 |
| EP | 2003805 A2 | 12/2008 |

(Continued)

*Primary Examiner* — Li Liu (74) *Attorney, Agent, or Firm* — Conley Rose, P.C.

(57) ABSTRACT

A method for determining an optical signal power change, wherein the method includes: A first optical signal that includes a plurality of wavelength signals is obtained, where the plurality of wavelength signals are distributed in a plurality of bands. Then, an optical power of each band and a center wavelength signal of each band are detected, and a preset single-wavelength transmit power and a preset coefficient are obtained. Next, an equivalent quantity N of equivalent wavelength signals is determined, and an equivalent wavelength signal corresponding to the first optical signal is determined. Further, a target power that is used to compensate for a first power change value of the first optical signal in transmission over an optical fiber is determined based on the preset coefficient, the equivalent wavelength signal, the equivalent quantity, and the preset single-wavelength transmit power.

23 Claims, 4 Drawing Sheets

(56) References Cited

U.S. PATENT DOCUMENTS

| | | | |
|---|---|---|---|
| 10,142,022 B1 | 11/2018 | Harley et al. | |
| 2006/0203329 A1* | 9/2006 | Nishihara | H01S 3/10015 359/337 |
| 2006/0219878 A1 | 10/2006 | Yano | |
| 2008/0080865 A1* | 4/2008 | Muro | H04J 14/0204 398/83 |
| 2008/0304829 A1* | 12/2008 | Sato | H04J 14/0221 398/79 |
| 2009/0091819 A1* | 4/2009 | Bolshtyansky | H01S 3/1301 359/341.5 |
| 2012/0219289 A1* | 8/2012 | Hayashi | H04J 14/0257 398/34 |
| 2018/0343078 A1* | 11/2018 | Roberts | H04B 10/58 |
| 2019/0312641 A1 | 10/2019 | Ishii et al. | |
| 2020/0044766 A1* | 2/2020 | Deng | H04B 10/2537 |

FOREIGN PATENT DOCUMENTS

| | | | |
|---|---|---|---|
| EP | 3001584 A1 | 3/2016 | |
| JP | 2004266865 A | 9/2004 | |
| WO | 2018187930 A1 | 10/2018 | |
| WO | WO-2018187930 A1 * | 10/2018 | H04B 10/2537 |

* cited by examiner

METHOD FOR DETERMINING OPTICAL SIGNAL POWER CHANGE AND POWER CALCULATION APPARATUS

CROSS-REFERENCE TO RELATED APPLICATIONS

This is a continuation of International Patent Application No. PCT/CN2019/114838, filed on Oct. 31, 2019, the disclosure of which is hereby incorporated by reference in its entirety.

TECHNICAL FIELD

This application relates to the field of optical communications, and in particular, to a method for determining an optical signal power change and a power calculation apparatus.

BACKGROUND

With rapid growth of data traffic in a network, a higher requirement is posed on a network transmission capacity. Usually, a channel spectrum width (a quantity of channels) may be increased to increase the network transmission capacity. For example, an original C band is extended to a C band and an L band.

However, as the channel spectrum width increases, a stimulated Raman scattering (SRS) effect exists in a link of a multi-wavelength transmission system, and a transmit power of a short band is transferred to a transmit power of a long band. In a stable state without adding or dropping, power transfer between a plurality of wavelength signals that is caused by the SRS effect is stable. When adding or dropping occurs, a quantity, a distribution, positions, and the like of the plurality of wavelength signals change randomly. Consequently, a complex change is caused to the power transfer between the plurality of wavelength signals, and may exceed a system tolerance capability, reducing signal transmission stability.

SUMMARY

Embodiments of this application provide a method for determining an optical signal power change and a power calculation apparatus.

According to a first aspect, an embodiment of this application provides a method for determining an optical signal power change. The method includes the following steps.

A power calculation apparatus obtains a first optical signal that includes a plurality of wavelength signals, where the plurality of wavelength signals are distributed in a plurality of bands, different bands correspond to different wavelength signals, and where each band includes at least one wavelength signal of the plurality of wavelength signals; then, detects an optical power of each band and a center wavelength signal of each band, and obtains a preset single-wavelength transmit power and a preset coefficient; next, determines an equivalent quantity N of equivalent wavelength signals based on the optical power of each band and the preset single-wavelength transmit power, and determines an equivalent wavelength signal corresponding to the first optical signal based on the optical power of each band and the center wavelength signal of each band; and, further, determines a target power based on the preset coefficient, the equivalent wavelength signal, the equivalent quantity, and the preset single-wavelength transmit power, where the target power is used to compensate for a first power change value of the first optical signal in transmission over an optical fiber.

According to a second aspect, an embodiment of this application provides a power calculation apparatus, including a processor, a memory, and an optical detection module, where the processor, the memory, and the optical detection module are connected to each other using a line; the optical detection module is configured to: obtain a first optical signal, where the first optical signal includes a plurality of wavelength signals, where the plurality of wavelength signals are distributed in a plurality of bands, where different bands correspond to different wavelength signals, and where each band includes at least one wavelength signal; and detect an optical power of each band and a center wavelength signal of each band, and output the optical power of each band and the center wavelength signal of each band to the processor; and the processor is configured to: obtain a preset single-wavelength transmit power and a preset coefficient from the memory, where the preset coefficient is a power change coefficient of the first optical signal in transmission over an optical fiber; determine an equivalent quantity N of equivalent wavelength signals based on the optical power of each band and the preset single-wavelength transmit power, where a total power of the N equivalent wavelength signals is equal to a total power of the first optical signal; determine an equivalent wavelength signal corresponding to the first optical signal based on the optical power of each band and the center wavelength signal of each band, where a difference between a power change value of the N equivalent wavelength signals in transmission over the optical fiber and a first power change value of the first optical signal in the transmission over the optical fiber falls within a preset range; and determine a target power based on the preset coefficient, the equivalent wavelength signal, the equivalent quantity, and the preset single-wavelength transmit power, where the target power is used to compensate for the first power change value.

According to a third aspect, an embodiment of this application provides an optical transmission system, including a first site, a second site, a multiplexer, and a demultiplexer. The first site is configured to perform the method for determining an optical signal power change according to any implementation of the first aspect. The multiplexer is configured to multiplex an optical signal output by the first site, and transmit the multiplexed optical signal to the demultiplexer using an optical fiber. The demultiplexer is configured to demultiplex the multiplexed optical signal, and transmit the demultiplexed optical signal to the second site.

DESCRIPTION OF EMBODIMENTS

Embodiments of this application provide a method for determining an optical signal power change and a power calculation apparatus. Before a multi-wavelength signal enters an optical fiber, a power calculation apparatus may calculate a target power based on detected data. The target power is used to compensate for a power change of the multi-wavelength signal that is generated in a process of transmission over the optical fiber, such that an optical power of the multi-wavelength signal can be compensated for based on the target power in time, and the power change of the multi-wavelength signal in the process of transmission over the optical fiber does not exceed a system tolerance capability, thereby improving signal transmission stability.

It should be noted that the terms "first", "second", "third", "fourth", and the like in the specification, claims, and accompanying drawings of this application are used to distinguish between similar objects, but do not limit a specific order or sequence. It should be understood that the foregoing terms are interchangeable in proper circumstances, such that the embodiments described in this application can be implemented in other orders rather than the content described in this application. Moreover, the terms "include", "have", and any variant thereof are intended to cover non-exclusive inclusion. For example, processes, methods, systems, products, or devices that include a series of steps or units are not limited to the steps or the units that are clearly listed, but may include other steps or units that are not clearly listed or inherent to the processes, methods, products, or devices.

Figure 1:
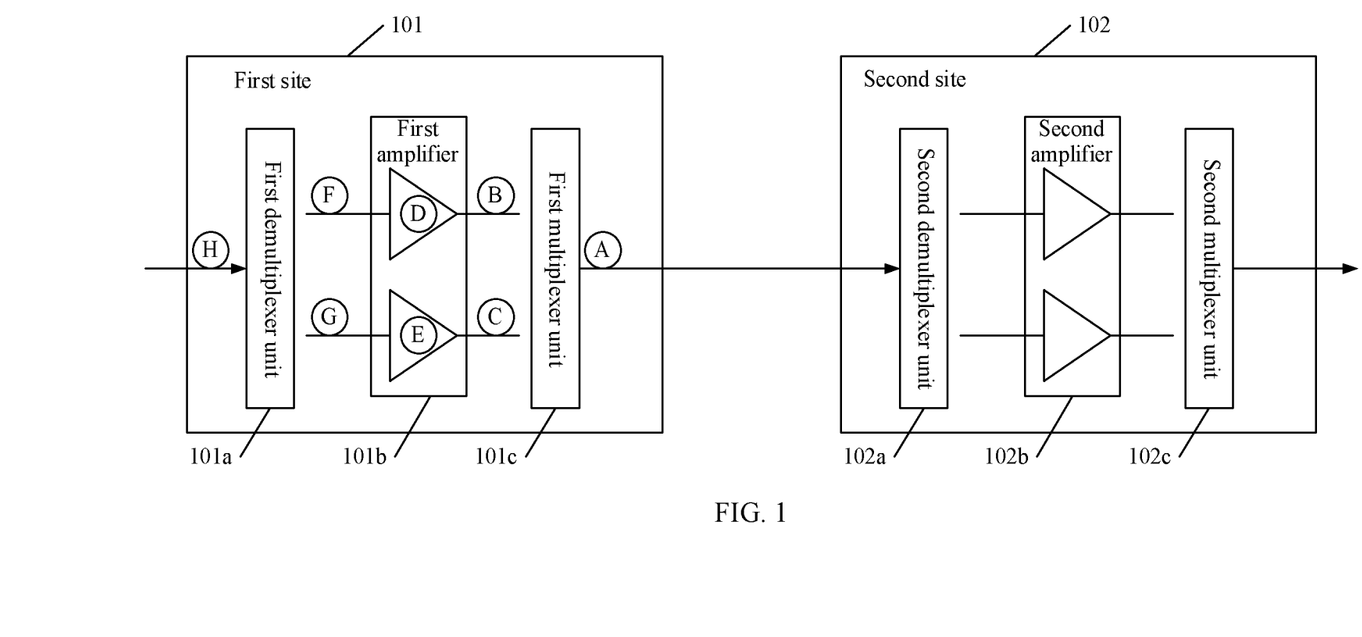
FIG. 1 is a schematic diagram of a structure of an optical transmission system applied to this application.

FIG. 1 is a schematic diagram of a structure of an optical transmission system applied to this application. The optical transmission system includes at least a first site 101 and a second site 102. The first site may include a first demultiplexer unit 101a, a first amplifier 101b, and a first multiplexer unit 101c. The second site may include a second demultiplexer unit 102a, a second amplifier 102b, and a second multiplexer unit 102c. As shown in FIG. 1, unidirectional transmission is used as an example for description. The first site 101 may transmit a multi-wavelength signal to the second site 102 using an optical fiber. The transmission of the multi-wavelength signal in the optical fiber is affected by a Stimulated Raman Scattering (SRS) effect, and consequently a transmit power of a short band is transferred to a transmit power of a long band.

It can be understood that, when the current multi-wavelength signal is not added or dropped, power transfer between a plurality of wavelength signals due to the SRS effect is stable. When adding or dropping occurs, a quantity, a distribution, positions, and the like of the plurality of wavelength signals change randomly. Consequently, a complex change is caused to the power transfer between the plurality of wavelength signals, and such a complex change may exceed a system tolerance capability. Therefore, in this application, a power calculation apparatus is disposed in the first site 101. Before the multi-wavelength signal output by the first site 101 enters the optical fiber, the power calculation apparatus may calculate a power change situation in advance, and compensate for a transmit power of the multi-wavelength signal based on a calculation result in time. This avoids a complex change in the power transfer between the plurality of wavelength signals in a process of transmission over the optical fiber, thereby improving signal transmission stability.

For example, the power calculation apparatus may be disposed in any position of A to H shown in FIG. 1. For example, the power calculation apparatus may be an independent apparatus disposed in a position shown by A, or may be an apparatus that is disposed in a position shown by D or E and that is integrated with the first amplifier 101b. This is not specifically limited herein.

It should be noted that, a type of each of the first amplifier 101b and the second amplifier 102b may be an erbium-doped fiber amplifier (EDFA), a semiconductor optical amplifier (SOA), or the like, and may be an integrated amplifier or a discrete amplifier. This is not specifically limited herein. Except the optical amplifier site shown in FIG. 1, the first site 101 and the second site 102 each may be another type of site, for example, may be a reconfigurable optical add/drop multiplexer (ROADM) site. This is not specifically limited herein.

The following describes the method for determining an optical signal power change provided in this application.

Figure 2:
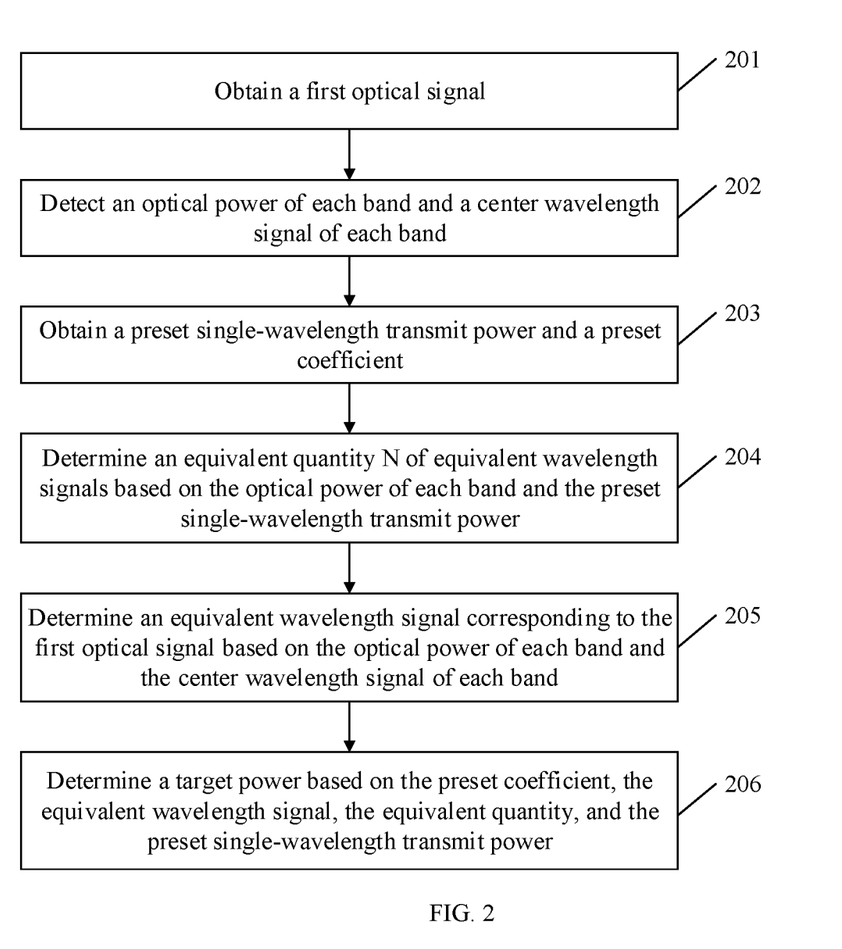
FIG. 2 is a schematic diagram of an embodiment of a method for determining an optical signal power change according to this application.

FIG. 2 is a schematic diagram of an embodiment of the method for determining an optical signal power change according to this application. In this example, the method for determining an optical signal power change includes the following steps.

201. Obtain a First Optical Signal

In this embodiment, a power calculation apparatus receives an input first optical signal. The first optical signal includes a plurality of wavelength signals. The plurality of wavelength signals are distributed in a plurality of bands, different bands correspond to different wavelength signals, and each band includes at least one wavelength signal of the plurality of wavelength signals. It can be understood that, each wavelength signal has a corresponding wavelength value. For ease of description, in this application, wavelength signals (Ch1, Ch2, and the like) are distinguished using channel serial numbers of the wavelength signals. The wavelength value of each wavelength signal may be determined using a channel serial number of each wavelength signal.

Figure 3:
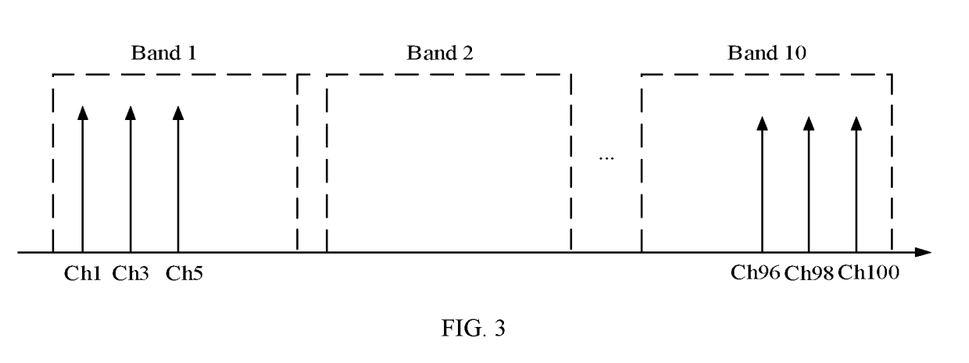
FIG. 3 is a schematic diagram of an embodiment in which a multi-wavelength signal is distributed in a plurality of bands.

FIG. 3 is a schematic diagram of an embodiment in which a multi-wavelength signal is distributed in a plurality of bands. For example, a full-wavelength signal includes 100 wavelength signals (Ch1 to Ch100) in total, and the 100 wavelength signals are distributed in 10 different bands. Every 10 continuous wavelength signals are distributed in a same band, for example, the wavelength signals Ch1 to Ch10 are distributed in band 1, the wavelength signals Ch11 to Ch20 are distributed in band 2, . . . , and the wavelength signals Ch91 to Ch100 are distributed in band 10. The first optical signal in this application includes six wavelength signals: Ch1, Ch3, Ch5, Ch96, Ch98, and Ch100. The wavelength signals Ch1, Ch3, and Ch5 are distributed in band 1, and the wavelength signals Ch96, Ch98, and Ch100 are distributed in band 10.

It should be noted that, a quantity of bands is not limited in this application, and the quantity of bands may be 10 described above, 20, 30, or the like. In actual application, bands may be divided in a plurality of manners, which may include the equal division manner shown in FIG. 3, and a non-equal division manner, in which different bands correspond to different quantities of wavelength signals. In addition, the bands may also have different division granularities. For example, each band may correspond to a plurality of wavelength signals, as shown in FIG. 3. Alternatively, each band may uniquely correspond to one wavelength signal. This is not specifically limited herein.

202. Detect an Optical Power of Each Band and a Center Wavelength Signal of Each Band In this embodiment, the power calculation apparatus may determine the optical power of each band and the center wavelength signal of each band using an optical detection module disposed inside the power calculation apparatus. It should be noted that, the optical detection module in this application may have a plurality of implementations, which are separately described below.

In a first implementation, the optical detection module includes a filter unit and a power detection unit.

Figure 4:
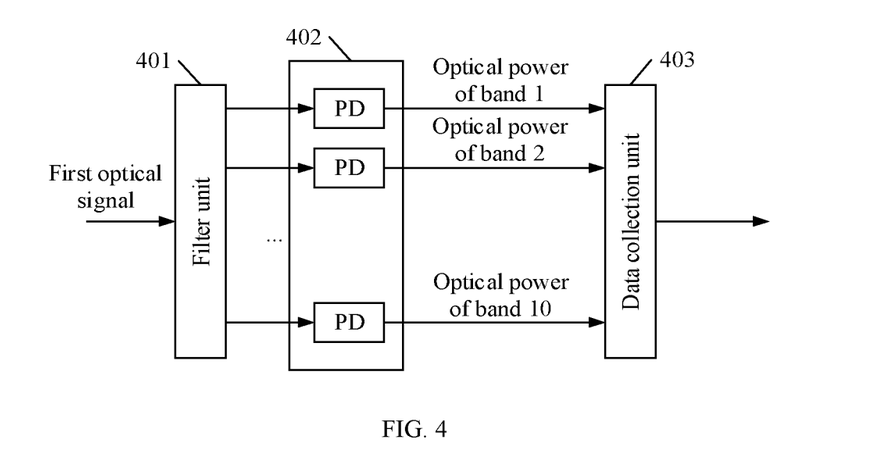
FIG. 4 is a first schematic diagram of a structure of an optical detection module.

FIG. 4 is a first schematic diagram of a structure of the optical detection module. For example, a filter unit 401 may include components that have a filtering effect, such as an optical grating and a filter. After being processed by the filter unit 401, the input first optical signal may be divided into a plurality of bands, for example, in the division manner shown in FIG. 3. A power detection unit 402 includes a plurality of power detects (PDs), and each PD is configured to detect an optical power of a band corresponding to the PD. For example, as shown in FIG. 3, if the first optical signal is distributed in band 1 and band 10, a first PD and a tenth PD are needed correspondingly to detect optical powers of band 1 and band 10, respectively. In addition, a wavelength signal in a central wavelength range of each band is usually selected as a center wavelength signal of the band. For example, as shown in FIG. 3, a center wavelength signal of band 1 may be a wavelength signal Ch5, and a center wavelength signal of band 10 may be a wavelength signal Ch95. It can be understood that, the center wavelength signal of each band is not a wavelength signal in the central wavelength range of the band in a strict sense. In actual application, a selection manner of a center wavelength signal may also be properly adjusted. This is not specifically limited herein.

It should be noted that, the filter unit 401 may be an integrated design, or may be a discrete design, or may be in a form of a cascaded filter. This is not specifically limited herein.

Optionally, a data collection unit 403 may be further disposed in the optical detection module, and is configured to collect information detected by the power detection unit. The data collection unit may be implemented by a component that has a data collection function, such as an analog-to-digital converter (ADC).

In a second implementation, the optical detection module includes a high-speed spectrum detection unit.

Figure 5:
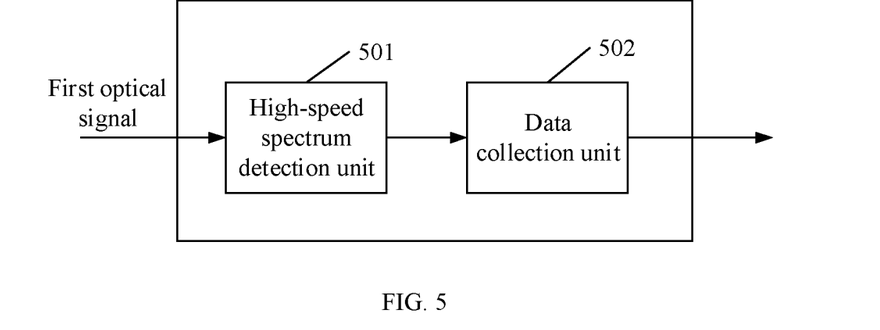
FIG. 5 is a second schematic diagram of a structure of an optical detection module.

FIG. 5 is a second schematic diagram of a structure of the optical detection module. For example, a high-speed spectrum detection unit 501 may be an optical spectrum analyzer (OSA), an optical performance monitor (OPM), or the like. The high-speed spectrum detection unit 501 may quickly detect spectral information of the first optical signal, for example, may detect an optical power of each wavelength signal in the first optical signal. That is, the optical power of each wavelength signal that is detected using the high-speed spectrum detection unit 501 is an optical power of a band corresponding to each wavelength signal. In addition, in this implementation, each band uniquely corresponds to one wavelength signal, and the wavelength signal is the center wavelength signal corresponding to the band.

Optionally, in this implementation, a data collection unit 502 may also be disposed inside the optical detection module, and is configured to collect information detected by the high-speed spectrum detection unit 501. The data collection unit may be implemented by a component that has a data collection function, such as an ADC.

203. Obtain a Preset Single-Wavelength Transmit Power and a Preset Coefficient In this embodiment, the preset single-wavelength transmit power may be a rated transmit power of each wavelength signal. The preset coefficient may be a power change coefficient of the first optical signal in transmission over an optical fiber. The preset single-wavelength transmit power and the preset coefficient are related to transmission type parameters of the first optical signal. For example, the transmission type parameters may include an optical fiber length, an optical fiber type, and an optical amplifier type. The power calculation apparatus may query, using a preset data table stored in the memory, the preset single-wavelength transmit power and the preset coefficient that are corresponding to the transmission type parameters. The preset data table may be shown in Table 1 below:

TABLE 1

| Data table | Optical fiber length | 80 kilometers (km) | |
|---|---|---|---|
| | Optical fiber type | G.652 | G.654 |
| | Optical amplifier type | OA_x | OA_x |
| | Preset single-wavelength transmit power | P1 | P2 |
| | Preset coefficient | K1 | K2 |

It can be understood that, after a network is constructed, parameters such as the optical fiber length, the optical fiber type, and the optical amplifier type can usually be determined. These parameters may be stored in advance and refreshed periodically. In addition, this application is not limited to the three transmission type parameters listed above. For example, the transmission type parameters may further include a transmission insertion loss. This is not specifically limited herein.

Optionally, there may be one preset coefficient or a group of (a plurality of) preset coefficients. For example, K1 may further include $K1_A$, $K1_B$, and $K1_C$. A specific quantity is not limited herein.

204. Determine an Equivalent Quantity N of Equivalent Wavelength Signals Based on the Optical Power of Each Band and the Preset Single-Wavelength Transmit Power In this embodiment, a total power of the N equivalent wavelength signals is equal to a total power of the first optical signal. For example, the optical power of each band and the preset single-wavelength transmit power may be substituted into the following first formula to calculate the equivalent quantity N.

The first formula is:

$$N=\Sigma P_1/P_0.$$

N represents the equivalent quantity, $P_0$ represents the preset single-wavelength transmit power, and $P_1$ represents the optical power of each band or the optical power of each wavelength signal. It can be understood that, if the optical detection module uses the first implementation listed in step 202, $P_1$ represents the optical power of each band. If the optical detection module uses the second implementation listed in step 202, $P_1$ represents the optical power of each wavelength signal. $\Sigma P_1$ can calculate a sum of the optical powers of all the bands, which is the total power of the first optical signal, and the optical power of each equivalent wavelength signal is the preset single-wavelength transmit power. For example, as shown in FIG. 3, an optical power of band 1 is P_1, and an optical power of band 10 is P_10. In this case, N=(P_1+P_10)/$P_0$. For example, if P_1=10 decibel (dB) milliwatts (dBm), P_10=15 dBm, and $P_0$=3 dBm, N=(10+15)/3=8.3. N obtained by calculation may be rounded to finally obtain N=8 or 9. Whether N is specifically rounded up or down is not limited herein.

205. Determine an Equivalent Wavelength Signal Corresponding to the First Optical Signal Based on the Optical Power of Each Band and the Center Wavelength Signal of Each Band

In this embodiment, a difference between a power change value of the N equivalent wavelength signals in transmission over the optical fiber and a first power change value of the first optical signal in the transmission over the optical fiber falls within a preset range. That is, an effect of transmitting the N equivalent wavelength signals over the optical fiber is equivalent to that of transmitting the first optical signal over the optical fiber. For example, the optical power of each band and the center wavelength signal of each band may be substituted into the following second formula to calculate the equivalent wavelength signal.

The second formula is:

$$M_0 = [\Sigma(M_1 * P_1)/]\Sigma P_1.$$

$M_0$ represents the equivalent wavelength signal, $M_1$ represents the center wavelength signal of each band or each wavelength signal, and $P_1$ represents the optical power of each band or the optical power of each wavelength signal. It can be understood that, if the optical detection module uses the first implementation listed in step 202, $M_1$ represents the central wavelength signal of each band, and $P_1$ represents the optical power of each band. If the optical detection module uses the second implementation listed in step 202, $M_1$ represents each wavelength signal, and $P_1$ represents the optical power of each wavelength signal. For example, as shown in FIG. 3, an optical power of band 1 is P_1, an optical power of band 10 is P_10, a center wavelength signal of band 1 is Ch5, and a center wavelength signal of band 10 is Ch95. In this case, $M_0$=(5*P_1+95*P_10)/(P_1+P_10).

It should be noted that, in the foregoing second formula, a serial number corresponding to the center wavelength signal of each band may be substituted into the second formula based on the foregoing example. In this way, a calculation result of the second formula reflects a corresponding equivalent wavelength signal in a form of a serial number. For example, $M_0$=(5*P_1+95*P_10)/(P_1+P_10)= 51 (Ch). In addition, a wavelength value corresponding to the center wavelength signal of each band may also be substituted into the second formula. In this case, $M_0$ represents a wavelength value of the equivalent wavelength signal. For example, $M_0$=(1550*P_1+1580*P_10)/(P_1+P_10)=1565 (nm).

206. Determine a Target Power Based on the Preset Coefficient, the Equivalent Wavelength Signal, the Equivalent Quantity, and the Preset Single-Wavelength Transmit Power

In this embodiment, a processor in the power calculation apparatus may obtain the target power by summing a product of the preset coefficient and the equivalent wavelength signal, a product of the preset coefficient and the equivalent quantity, and a product of the preset coefficient and the preset single-wavelength transmit power. The processor may be a micro control unit (MCU), a field-programmable gate array (FPGA), or the like. This is not specifically limited herein.

For example, the following algorithm may be used to calculate the target power.

For example: Target power=$\Sigma_1^m K1 \times (M_0 + N + P_0)$.

$M_0$ represents the equivalent wavelength signal, N represents the equivalent quantity of the equivalent wavelength signals, $P_0$ represents the preset single-wavelength transmit power, and m represents a quantity of preset coefficients K1. It can be understood that, if there are a plurality of preset coefficients K1, a product of the equivalent wavelength signal and its corresponding preset coefficient, a product of the equivalent quantity and its preset coefficient, and a product of the preset single-wavelength transmit power and its preset coefficient need to be separately calculated. For example, if K1 in the foregoing formula includes $K1_A$, $K1_B$, and $K1_C$, that is, m=3, the target power=$K1_A * M_0 + K1_B * N + K1_C * P_0$ in this case.

Optionally, the algorithm for calculating the target power in this application is not limited to the foregoing listed manner, and an appropriate variation may be further made based on the algorithm. This is not specifically limited herein.

For example: Target power=$\Sigma_1^m K1 \times (M_0 + N + P_0 + M_0 \times P_0 + M_0 \times N + P_0 \times N + M_0 \times N \times P_0)$.

$M_0$ represents the equivalent wavelength signal, N represents the equivalent quantity of the equivalent wavelength signals, $P_0$ represents the preset single-wavelength transmit power, and m represents a quantity of preset coefficients K1. If there are a plurality of preset coefficients K1, each term in the parentheses in the foregoing formula may have a corresponding preset coefficient. For example, if K1 includes $K1_A$, $K1_B$, $K1_C$, $K1_D$, $K1_E$, $K1_F$, and $K1_G$, that is m=7, the target power=$K1_A * M_0 + K1_B * N + K1_C * P_0 + K1_D * M_0 * P_0 + K1_E * M_0 * K1_F * P_0 * N + K1_G * (M_0 * N * P_0)$ in this case.

It should be noted that, the first optical signal may be a signal obtained after a second signal is added or dropped. The target power is a power difference between the first power change value and a second power change value. The first power change value is a power change value of the first optical signal in the transmission over the optical fiber. The second power change value is a power change value of the second signal in transmission over the optical fiber.

For example, as shown in FIG. 3, the second signal may be a full-wavelength signal including wavelength signals Ch1 to Ch100, and the first optical signal (including the wavelength signals Ch1, Ch3, Ch5, Ch96, Ch98, and Ch100) is obtained after the second signal is dropped. It is assumed that the first power change value is 1.2 dB, and the second power change value is 0.8 dB. Because the power change of the second signal in the transmission over the optical fiber is a stable change, a design of the system can tolerate the power change. However, the power change of the first optical signal in the transmission over the optical fiber exceeds a power change range that can be tolerated by the system. Therefore, the first power change value needs to be compensated for, such that the compensated power change approaches a stable state, that is, the compensated power change is close to the second power change value. That is, in an ideal state, the target power should be 1.2−0.8=0.4 dB.

In this embodiment of this application, before a multi-wavelength signal enters the optical fiber, the power calculation apparatus may calculate a target power based on detected data. The target power is used to compensate for a power change of the multi-wavelength signal that is generated in a process of transmission over the optical fiber, such that an optical power of the multi-wavelength signal can be compensated for based on the target power in time, and the power change of the multi-wavelength signal in the process of transmission over the optical fiber does not exceed a system tolerance capability, thereby improving signal transmission stability.

The foregoing describes the method for determining an optical signal power change according to the embodiments of this application. The following describes the power calculation apparatus according to the embodiments of this application.

Figure 6:
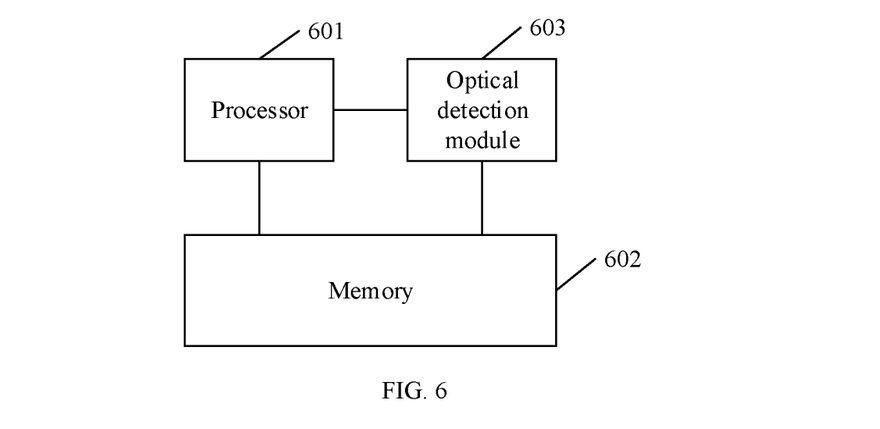
FIG. 6 is a schematic diagram of a structure of a power calculation apparatus.

FIG. 6 is a schematic diagram of a structure of the power calculation apparatus. The power calculation apparatus includes a processor 601, a memory 602, and an optical detection module 603. The processor 601, the memory 602, and the optical detection module 603 are connected to each other using a line. The memory 602 is configured to store program instructions and data. It should be noted that, the power calculation apparatus may be the power calculation apparatus that implements the method for determining an optical signal power change in the foregoing embodiment shown in FIG. 2.

In a possible implementation, the memory 602 stores program instructions and data that support the steps shown in FIG. 2, and the processor 601 and the optical detection module 603 are configured to perform the method steps shown in FIG. 2. For example, the following two implementations may be used.

In a first implementation, the optical detection module 603 is configured to perform steps 201 and 202 shown in FIG. 2, and the processor 601 is configured to perform steps 203 to 206 shown in FIG. 2.

In a second implementation, the optical detection module 603 is configured to perform steps 201 to 205 shown in FIG. 2, and the processor 601 is configured to perform steps 203 and 206 shown in FIG. 2.

It should be noted that, input transmission type parameters (such as an optical fiber length and an optical fiber type) are stored in the memory 602. A main difference between the foregoing two implementations is that: The optical detection module 603 in the first implementation only needs to transmit detected data to the processor 601, and the processor performs all subsequent calculation. The optical detection module 603 in the second implementation may further integrate with a processing unit. The processing unit may obtain a preset single-wavelength transmit power from the memory, and calculate equivalent wavelength signals and an equivalent quantity of the equivalent wavelength signals with reference to collected data. The processor 601 only needs to obtain a preset coefficient from the memory, and perform step 206.

It can be understood that, the optical detection module 603 may be divided into a filter unit, a power detection unit, and a data collection unit, as shown in FIG. 4. Alternatively, the optical detection module 603 may be divided into a high-speed spectrum detection unit and a data collection unit, as shown in FIG. 5.

Figure 7:
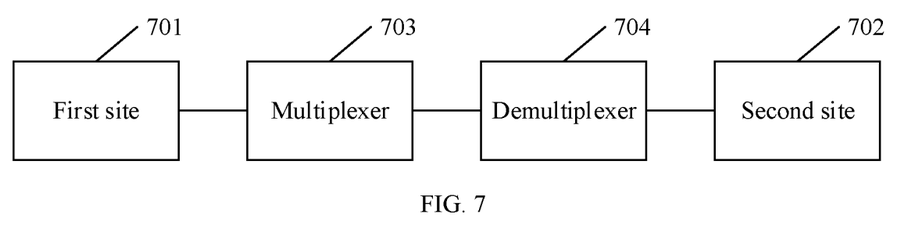
FIG. 7 is a schematic diagram of a structure of an optical transmission system according to this application.

FIG. 7 is a schematic diagram of a structure of an optical transmission system according to this application. The optical transmission system includes a first site 701, a second site 702, a multiplexer 703, and a demultiplexer 704. The multiplexer 703 is configured to multiplex an optical signal output by the first site 701, and transmit the multiplexed optical signal to the demultiplexer 704 using an optical fiber. The demultiplexer is configured to demultiplex the multiplexed optical signal, and transmit the demultiplexed optical signal to the second site 702. For example, the first site 701 is configured to perform any method step in the embodiment shown in FIG. 2. Before the multi-wavelength signal output by the first site 701 enters the optical fiber, a power change situation may be calculated in advance, in order to compensate for a transmit power of the multi-wavelength signal based on a calculation result in time.

Optionally, the first site 701 may be an optical amplifier site, an ROADM site, or the like. The multiplexer 703 may be an independent device, or may be integrated into the first site 701. The demultiplexer 704 may be an independent device, or may be integrated into the second site 702. This is not specifically limited herein.

A person of ordinary skill in the art may understand that all or some of the steps in the foregoing embodiments may be implemented by hardware or a program instructing related hardware. The program may be stored in a computer-readable storage medium. The storage medium may be a read-only memory, a random-access memory, or the like. For example, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraints of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Finally, it should be noted that the foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining an optical signal power change, comprising:
obtaining a first optical signal, wherein the first optical signal comprises a plurality of wavelength signals distributed in a plurality of bands, wherein different bands correspond to different wavelength signals, and wherein each band comprises at least one wavelength signal of the plurality of wavelength signals;
detecting an optical power and a center wavelength signal of each band;
obtaining a preset single-wavelength transmit power and a preset coefficient, wherein the preset coefficient is a power change coefficient of the first optical signal in transmission over an optical fiber;
determining an equivalent quantity N of equivalent wavelength signals based on the optical power of each band and the preset single-wavelength transmit power, wherein a total power of the N equivalent wavelength signals is equal to a total power of the first optical signal;
determining an equivalent wavelength signal corresponding to the first optical signal based on the optical power of each band and the center wavelength signal of each band, wherein a difference between a power change value of the N equivalent wavelength signals in transmission over the optical fiber and a first power change value of the first optical signal in the transmission over the optical fiber falls within a preset range; and
determining a target power based on the preset coefficient, the equivalent wavelength signal, the equivalent quantity, and the preset single-wavelength transmit power, wherein the target power is configured to compensate for the first power change value.

2. The method of claim 1, wherein the first optical signal is obtained after a second optical signal is added or dropped, and wherein the target power is a power difference between the first power change value and a second power change value of the second optical signal in transmission over the optical fiber.

3. The method of claim 1, wherein determining the target power comprises obtaining the target power by summing a product of the preset coefficient and the equivalent wavelength signal, a product of the preset coefficient and the equivalent quantity, and a product of the preset coefficient and the preset single-wavelength transmit power.

4. The method of claim 1, wherein determining the equivalent quantity N of the equivalent wavelength signals comprises substituting the optical power of each band and the preset single-wavelength transmit power into a first formula to calculate the equivalent quantity N, wherein the first formula comprises:

$$N=\Sigma P_1/P_0,$$

wherein N represents the equivalent quantity, wherein $P_1$ represents the optical power of each band, and wherein $P_0$ represents the preset single-wavelength transmit power.

5. The method of claim 1, wherein determining the equivalent wavelength signal corresponding to the first optical signal comprises substituting the optical power of each band and the center wavelength signal of each band into a second formula to calculate the equivalent wavelength signal, wherein the second formula comprises:

$$M_0=[\Sigma(M_1*P_1)]/\Sigma P_1,$$

wherein $M_0$ represents the equivalent wavelength signal, wherein $M_1$ represents the center wavelength signal of each band, and wherein $P_1$ represents the optical power of each band.

6. The method of claim 1, wherein each band comprises one wavelength signal of the plurality of wavelength signals, wherein detecting the center wavelength signal of each band comprises detecting a wavelength signal corresponding to each band, and wherein detecting the optical power of each band comprises detecting an optical power of the wavelength signal corresponding to each band.

7. The method of claim 6, wherein determining the equivalent quantity N of equivalent wavelength signals comprises substituting the optical power of the wavelength signal corresponding to each band and the preset single-wavelength transmit power into a third formula to calculate the equivalent quantity N, wherein the third formula comprises:

$$N=\Sigma P_2/P_0,$$

wherein N represents the equivalent quantity, wherein $P_2$ represents the optical power of the wavelength signal corresponding to each band, and wherein $P_0$ represents the preset single-wavelength transmit power.

8. The method of claim 6, wherein determining the equivalent wavelength signal corresponding to the first optical signal comprises substituting the optical power of the wavelength signal corresponding to each band and the wavelength signal corresponding to each band into a fourth formula to calculate the equivalent wavelength signal, wherein the fourth formula comprises:

$$M_0=[\Sigma(M_2*P_2)]/\Sigma P_2,$$

wherein $M_0$ represents the equivalent wavelength signal, wherein $P_2$ represents the optical power of the wavelength signal corresponding to each band, and wherein $M_2$ represents the wavelength signal corresponding to each band.

9. The method of claim 1, wherein obtaining the preset single-wavelength transmit power and the preset coefficient comprises:
obtaining transmission type parameters of the first optical signal, wherein the transmission type parameters comprise an optical fiber length, an optical fiber type, and an optical amplifier type; and
querying, using a preset data table, the preset single-wavelength transmit power and the preset coefficient that are corresponding to the transmission type parameters.

10. A power calculation apparatus, comprising:
an optical detector configured to:
obtain a first optical signal comprising a plurality of wavelength signals distributed in a plurality of bands, wherein different bands correspond to different wavelength signals, and wherein each band comprises at least one wavelength signal of the plurality of wavelength signals;
detect an optical power and a center wavelength signal of each band; and
output the optical power and the center wavelength signal of each band; and
a processor configured to:
obtain the optical power and the center wavelength signal from the optical detector;

obtain a preset single-wavelength transmit power and a preset coefficient, wherein the preset coefficient is a power change coefficient of the first optical signal in transmission over an optical fiber;

determine an equivalent quantity N of equivalent wavelength signals based on the optical power of each band and the preset single-wavelength transmit power, wherein a total power of the N equivalent wavelength signals is equal to a total power of the first optical signal;

determine an equivalent wavelength signal corresponding to the first optical signal based on the optical power and the center wavelength signal, wherein a difference between a power change value of the N equivalent wavelength signals in transmission over the optical fiber and a first power change value of the first optical signal in the transmission over the optical fiber falls within a preset range; and determine a target power based on the preset coefficient, the equivalent wavelength signal, the equivalent quantity, and the preset single-wavelength transmit power, wherein the target power is configured to compensate for the first power change value.

11. The power calculation apparatus of claim 10, wherein the first optical signal is obtained after a second optical signal is added or dropped, and wherein the target power is a power difference between the first power change value and a second power change value of the second optical signal in transmission over the optical fiber.

12. The power calculation apparatus of claim 10, wherein the processor is further configured to obtain the target power by summing a product of the preset coefficient and the equivalent wavelength signal, a product of the preset coefficient and the equivalent quantity, and a product of the preset coefficient and the preset single-wavelength transmit power.

13. The power calculation apparatus of claim 10, wherein the optical detector comprises a filter and a power detector, wherein the filter is configured to detect the center wavelength signal of each band, wherein the power detector is configured to detect the optical power of each band, and wherein the processor is further configured to substitute the optical power of each band and the preset single-wavelength transmit power into a first formula to calculate the equivalent quantity N, wherein the first formula comprises:

$$N = \Sigma P_1 / P_0,$$

wherein N represents the equivalent quantity, wherein $P_1$ represents the optical power of each band, and wherein $P_0$ represents the preset single-wavelength transmit power.

14. The power calculation apparatus of claim 10, wherein the processor is further configured to substitute the optical power of each band and the center wavelength signal of each band into a second formula to calculate the equivalent wavelength signal, wherein the second formula comprises:

$$M_0 = [\Sigma(M_1 * P_1)] / \Sigma P_1,$$

wherein $M_0$ represents the equivalent wavelength signal, wherein $M_1$ represents the center wavelength signal of each band, and wherein $P_1$ represents the optical power of each band.

15. The power calculation apparatus of claim 10, wherein each band comprises one wavelength signal of the plurality of wavelength signals, wherein and wherein the optical detector comprises a spectrometer configured to detect a wavelength signal corresponding to each band and an optical power of the wavelength signal corresponding to each band.

16. The power calculation apparatus of claim 15, wherein the processor is further configured to substitute the optical power of the wavelength signal corresponding to each band and the preset single-wavelength transmit power into a third formula to calculate the equivalent quantity N, wherein the third formula comprises:

$$N = \Sigma P_2 / P_0,$$

wherein N represents the equivalent quantity, wherein $P_2$ represents the optical power of the wavelength signal corresponding to each band, and wherein $P_0$ represents the preset single-wavelength transmit power.

17. The power calculation apparatus of claim 15, wherein the processor is further configured to substitute the optical power of the wavelength signal corresponding to each band and the wavelength signal corresponding to each band into a fourth formula to calculate the equivalent wavelength signal, wherein the fourth formula comprises:

$$M_0 = [\Sigma(M_2 * P_2)] / \Sigma P_2,$$

wherein $M_0$ represents the equivalent wavelength signal, wherein $P_2$ represents the optical power of the wavelength signal corresponding to each band, and wherein $M_2$ represents the wavelength signal corresponding to each band.

18. The power calculation apparatus of claim 10, wherein the processor is further configured to:

obtain transmission type parameters of the first optical signal, wherein the transmission type parameters comprise an optical fiber length, an optical fiber type, and an optical amplifier type; and query, using a preset data table, the preset single-wavelength transmit power and the preset coefficient that are corresponding to the transmission type parameters.

19. An optical transmission system, comprising:

a power calculation apparatus at a first site, wherein the power calculation apparatus comprises an optical detector configured to:

obtain a first optical signal comprising a plurality of wavelength signals distributed in a plurality of bands, wherein different bands correspond to different wavelength signals, and wherein each band comprises at least one wavelength signal of the plurality of wavelength signals;

detect an optical power and a center wavelength signal of each band;

output the optical power of each band and the center wavelength signal of each band;

obtain a preset single-wavelength transmit power and a preset coefficient, wherein the preset coefficient is a power change coefficient of the first optical signal in transmission over an optical fiber;

determine an equivalent quantity N of equivalent wavelength signals based on the optical power of each band and the preset single-wavelength transmit power, wherein a total power of the N equivalent wavelength signals is equal to a total power of the first optical signal;

determine an equivalent wavelength signal corresponding to the first optical signal based on the optical power of each band and the center wavelength signal of each band, wherein a difference between a power change value of the N equivalent wavelength signals in transmission over the optical fiber and a first power change value of the first optical signal in the transmission over the optical fiber falls within a preset range; and determine a target power based on the preset coefficient, the equivalent wavelength signal, the equivalent quantity, and the preset single-wavelength transmit power, wherein the target power is configured to compensate for the first power change value;

a multiplexer configured to multiplex an optical signal output by the first site and transmit the multiplexed optical signal using an optical fiber; and a demultiplexer configured to demultiplex the multiplexed optical signal and transmit the demultiplexed optical signal to a second site in the optical transmission system.

20. The optical transmission system of claim 19, wherein the first site comprises an optical amplifier site or a reconfigurable optical add/drop multiplexer (ROADM) site.

21. The optical transmission system of claim 19, wherein the first optical signal is obtained after a second optical signal is added or dropped, and wherein the target power is a power difference between the first power change value and a second power change value of the second optical signal in transmission over the optical fiber.

22. The optical transmission system of claim 19, wherein the processor is further configured to obtain the target power by summing a product of the preset coefficient and the equivalent wavelength signal, a product of the preset coefficient and the equivalent quantity, and a product of the preset coefficient and the preset single-wavelength transmit power.

23. The optical transmission system of claim 19, wherein the optical detector comprises a filter and a power detector, wherein the filter is configured to detect the center wavelength signal of each band, wherein the power detector is configured to detect the optical power of each band, and wherein the processor is further configured to substitute the optical power of each band and the preset single-wavelength transmit power into a first formula to calculate the equivalent quantity N, wherein the first formula comprises:

$$N=\Sigma P_1/P_0,$$

wherein N represents the equivalent quantity, wherein $P_1$ represents the optical power of each band, and wherein $P_0$ represents the preset single-wavelength transmit power.

* * * * *